United States Patent
Qu

(10) Patent No.: US 10,481,445 B2
(45) Date of Patent: Nov. 19, 2019

(54) ARRAY SUBSTRATE AND FABRICATION METHOD THEREOF, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Lianjie Qu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 73 days.

(21) Appl. No.: 15/758,142

(22) PCT Filed: Aug. 14, 2015

(86) PCT No.: PCT/CN2015/087019
§ 371 (c)(1),
(2) Date: Mar. 7, 2018

(87) PCT Pub. No.: WO2016/101633
PCT Pub. Date: Jun. 30, 2016

(65) Prior Publication Data
US 2018/0231820 A1    Aug. 16, 2018

(30) Foreign Application Priority Data
Dec. 26, 2014  (CN) .......................... 2014 1 0833921

(51) Int. Cl.
*G02F 1/1343* (2006.01)
*G02F 1/1362* (2006.01)
(Continued)

(52) U.S. Cl.
CPC ........ *G02F 1/13439* (2013.01); *G02F 1/1368* (2013.01); *G02F 1/133345* (2013.01);
(Continued)

(58) Field of Classification Search
None
See application file for complete search history.

(56) References Cited

U.S. PATENT DOCUMENTS

2003/0044720 A1    3/2003  Lai
2007/0103625 A1*   5/2007  Masutani .......... G02F 1/133555
                                                              349/114
(Continued)

FOREIGN PATENT DOCUMENTS

| CN | 1959508 A | 5/2007 |
| CN | 1959993 A | 5/2007 |
| CN | 104465672 A | 3/2015 |

OTHER PUBLICATIONS

International Search Report dated Aug. 14, 2015, issued in counterpart International Application No. PCT/CN2015/087019 (17 pages).

*Primary Examiner* — Marcos D. Pizarro
*Assistant Examiner* — Lawrence C Tynes, Jr.
(74) *Attorney, Agent, or Firm* — Westerman, Hattori, Daniels & Adrian, LLP

(57) ABSTRACT

An array substrate, a fabrication method of the array substrate, and a display device including the array substrate are provided. The array substrate includes a first electrode (54) including a plurality of first sub-electrodes, a second electrode (3) including a plurality of second sub-electrodes, and an insulating layer (6) disposed between the first electrode (54) and the second electrode (3). A plurality of via holes (61) are formed in the insulating layer (6), and the plurality of the second sub-electrodes are electrically connected to the plurality of the first sub-electrodes correspondingly through the plurality of the via holes (61). The array substrate further
(Continued)

includes a light compensating structure (4) disposed under an uneven portion of the insulating layer (6) to locally improve an exposure efficiency in a photolithographic process for forming the second electrode (3).

19 Claims, 8 Drawing Sheets

(51) Int. Cl.
  *G02F 1/1333* (2006.01)
  *G02F 1/1368* (2006.01)
(52) U.S. Cl.
  CPC .. *G02F 1/136209* (2013.01); *G02F 1/136227* (2013.01); *G02F 1/13624* (2013.01); *G02F 2001/134345* (2013.01); *G02F 2201/123* (2013.01); *G02F 2203/02* (2013.01)

(56) References Cited

U.S. PATENT DOCUMENTS

| | | |
|---|---|---|
| 2008/0111934 A1 | 5/2008 | Wu et al. |
| 2015/0138475 A1* | 5/2015 | Kohara ............. G02F 1/134363 349/43 |

* cited by examiner

ARRAY SUBSTRATE AND FABRICATION METHOD THEREOF, AND DISPLAY DEVICE

CROSS-REFERENCES TO RELATED APPLICATIONS

This application claims the priority of Chinese patent application No. CN201410833921.6, filed on Dec. 26, 2014, the entire content of which is incorporated herein by reference.

FIELD OF THE DISCLOSURE

The present disclosure generally relates to the field of display technologies and, more particularly, relates to an array substrate, a fabrication method of the array substrate, and a display device including the array substrate.

BACKGROUND

The current market of display devices demands higher and higher resolution. Many vendors constantly release new high resolution display devices. These high resolution display devices have smaller distance between pixel electrodes and require finer and sophisticated fabrication process.

A resin layer is often used for electrical isolation between electrodes in the display devices. A pixel electrode is electrically connected to a drain electrode of thin film transistor through via holes in the resin layer. Adjacent via holes are very close to each other and uneven thickness of the resin layer may be caused between the adjacent via holes. When forming the pixel electrode by a patterning process, due to the uneven thickness of the resin layer, the photoresist layer used for the patterning process may be thicker in one area than in another area. That is, the photoresist layer in some area may not have sufficient exposure and may leave residues after development. The subsequent process of etching pixel electrode may generate electrode residues of the pixel electrode on the resin layer in some area. Such electrode residues may increase the risk of short circuiting of adjacent pixel structures and affect operation of adjacent pixel structures.

As such, the uneven photoresist layer over the uneven resin layer may require extended light exposure to develop the thicker portion of the photoresist layer over the thinner resin layer between the adjacent via holes in the resin layer.

The disclosed array substrate, the fabrication method thereof, and display device including an array substrate are directed to solve one or more problems set forth above and other problems in the art.

BRIEF SUMMARY OF THE DISCLOSURE

One aspect of the present disclosure provides an array substrate. The array substrate includes a first electrode including a plurality of first sub-electrodes, a second electrode including a plurality of second sub-electrodes, and an insulating layer disposed between the first electrode and the second electrode. A plurality of via holes is formed in the insulating layer, and the plurality of the second sub-electrodes is electrically connected to the plurality of the first sub-electrodes correspondingly through the plurality of the via holes. The array substrate further includes a light compensating structure disposed under an uneven portion of the insulating layer to locally improve an exposure efficiency in a photolithographic process for forming the second electrode.

Optionally, the light compensating structure is made of an opaque and reflective material. Optionally, the light compensating structure includes a protrusion structure having a thickness to protrude the uneven portion of the insulating layer in a direction close to the second electrode.

Optionally, the first electrode includes a pixel electrode, the second electrode includes a drain electrode of a thin film transistor, and the light compensating structure and a gate electrode of the thin film transistor are formed of a same material in a single patterning process.

Optionally, the insulating layer is made of a resin material. Optionally, the insulating layer has a thickness of about 1.5 μm to about 5 μm. Optionally, the light compensating structure is made of one or a combination of tungsten, molybdenum niobium alloy, aluminum, aluminum neodymium alloy, titanium, and copper.

Optionally, the light compensating structure has a shape and a size matching with a shape and a size of a light exposure region in the photolithographic process for forming the second electrode. Optionally, the light compensating structure is square-shaped.

Optionally, the light compensating structure is electrically insulated from the first electrode and the second electrode.

Optionally, the array substrate further includes a display region, and a non-display region surrounding the display region. Gate lines and data lines are configured in the display region and are crossly configured to define pixel cells. At least one thin film transistor is configured in each pixel cell. The first sub-electrode is a drain electrode of the thin film transistor. A via hole is configured in the insulating layer corresponding to each drain electrode. The second sub-electrode is a pixel electrode configured over the insulating layer. The light compensating structure, disposed under the uneven portion of the insulating layer to locally improve the exposure efficiency, covers at least surrounding area of the via hole in the insulating layer.

Optionally, the at least one thin film transistor includes two thin film transistors inversely configured in each pixel cell, and the light compensating structure is configured under the uneven portion of the insulating layer between two adjacent via holes corresponding to two adjacent drain electrodes of the two thin film transistors.

Optionally, the at least one thin film transistor includes one thin film transistor configured in each pixel cell, and the light compensating structure is disposed under the via hole and the surrounding area of the via hole of each pixel cell.

Optionally, the first electrode further includes a lead-out electrode configured in the non-display region. The second electrode further includes a connection electrode positioned over the lead-out electrode. The insulating layer is extended to the non-display region and is disposed between the lead-out electrode and the connection electrode. The via hole is configured in the insulating layer adjacent to the corresponding lead-out electrode. The light compensating structure is positioned under the via holes and the surrounding area of the via holes in the insulating layer.

Another aspect of the present disclosure includes a display device, including any disclosed array substrate.

Another aspect of the present disclosure includes a method for forming an array substrate. A first electrode including a plurality of first sub-electrodes is formed. A second electrode including a plurality of second sub-electrodes is formed. An insulating layer is formed between the first electrode and the second electrode. A plurality of via holes is formed in the insulating layer. The plurality of the second sub-electrodes is electrically connected to the plurality of the first sub-electrodes correspondingly through the plurality of the via holes. A light compensating structure is formed under an uneven portion of the insulating layer to locally improve an exposure efficiency in a photolithographic process for forming the second electrode.

Optionally, the light compensating structure is made of an opaque and reflective material. Optionally, the light compensating structure includes a protrusion structure having a thickness to protrude the uneven portion of the insulating layer in a direction close to the second electrode.

Optionally, the first electrode includes a pixel electrode, the second electrode includes a drain electrode of a thin film transistor, and the light compensating structure and a gate electrode of the thin film transistor are formed of a same material in a single patterning process.

Optionally, the insulating layer is made of a resin material. Optionally, the insulating layer has a thickness of about 1.5 μm to about 5 μm. Optionally, the light compensating structure is made of one or a combination of tungsten, molybdenum niobium alloy, aluminum, aluminum neodymium alloy, titanium, and copper.

Optionally, the light compensating structure has a shape and a size matching with a shape and a size of a light exposure region in the photolithographic process for forming the second electrode. Optionally, the light compensating structure is square-shaped.

Optionally, the light compensating structure is electrically insulated from the first electrode and the second electrode.

Optionally, the array substrate further includes a display region, and a non-display region surrounding the display region. Gate lines and data lines are configured in the display region and are crossly configured to define pixel cells. At least one thin film transistor is configured in each pixel cell. The first sub-electrode is a drain electrode of the thin film transistor. A via hole is configured in the insulating layer corresponding to each drain electrode. The second sub-electrode is a pixel electrode configured over the insulating layer. The light compensating structure, disposed under the uneven portion of the insulating layer to locally improve the exposure efficiency, covers at least surrounding area of the via hole in the insulating layer.

Optionally, the at least one thin film transistor includes two thin film transistors inversely configured in each pixel cell, and the light compensating structure is configured under the uneven portion of the insulating layer between two adjacent via holes corresponding to two adjacent drain electrodes of the two thin film transistors.

Optionally, the at least one thin film transistor includes one thin film transistor configured in each pixel cell, and the light compensating structure is disposed under the via hole and the surrounding area of the via hole of each pixel cell.

Optionally, the first electrode further includes a lead-out electrode configured in the non-display region. The second electrode further includes a connection electrode positioned over the lead-out electrode. The insulating layer is extended to the non-display region and is disposed between the lead-out electrode and the connection electrode. The via hole is configured in the insulating layer adjacent to the corresponding lead-out electrode. The light compensating structure is positioned under the via holes and the surrounding area of the via holes in the insulating layer.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

Figure 1:
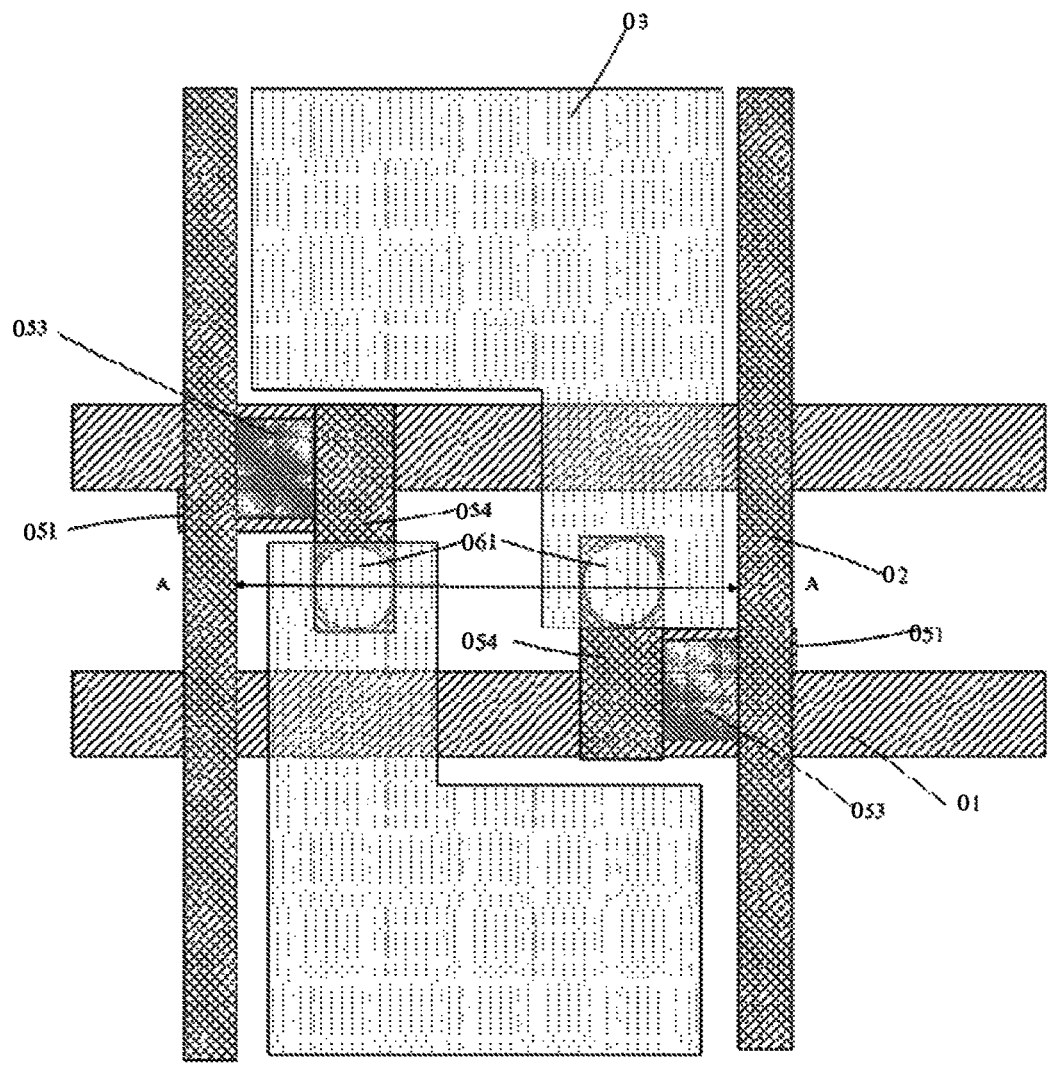
FIG. 1 illustrates a schematic view of a pixel structure of a conventional array substrate.
Figure 2:
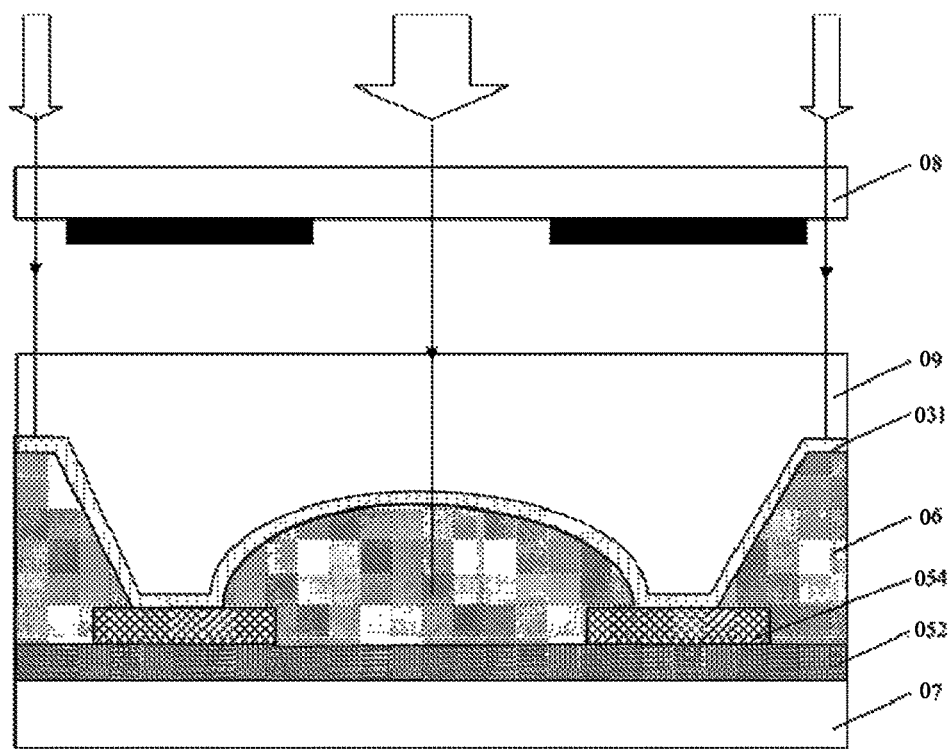
FIGS. 2-3 illustrates a cross sectional view of a conventional array substrate shown in FIG. 1 in the A-A direction.
Figure 3:
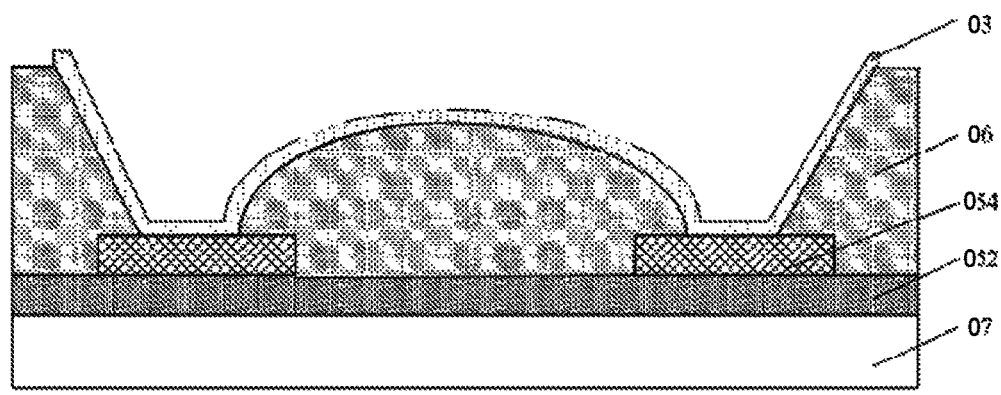

As shown in FIGS. 1-3, an array substrate in a liquid crystal display (LCD) device includes a plurality of gate lines 01 and a plurality of data lines 02 crossly configured to enclose a plurality of pixel cells. A pixel structure is configured in each pixel cell. The pixel structure includes a thin film transistor and a pixel electrode 03 configured over the thin film transistor. The pixel electrode 03 receives a voltage signal to drive a liquid crystal deflection to display images. However, the gate lines 01 and the data lines 02 also produce an electric field. The produced electric field may undesirably disturb the driving electric field generated by the pixel electrode. Consequently, the pixel electrode 03 must be isolated from the gate lines 01 and the data lines 02 to reduce the disturbance to the liquid crystal movement by the gate lines 01 and the data lines 02. Currently, resin materials are used to improve the fabrication process of the high resolution display devices. A resin layer 06 may be formed to isolate the pixel electrode 03 from the gate lines 01 and from the data lines 02 to improve the display quality.

However, the resin layer 06 causes other issues. One such issue is that the distance between adjacent pixel structures cannot be too close. Otherwise the source electrode and the pixel electrode 03 may be short circuited. The use of the resin material is thus limited.

In a pixel structure as shown in FIG. 1, the pixel electrode 03 is electrically connected to the drain electrode 054 of the thin film transistor through the via hole 061 in the resin layer 06. Referring to FIG. 2, in an array substrate having two adjacent via holes 061 in the resin layer 06, because the two via holes 061 are very close to each other, the thickness of the resin layer 06 between the two via holes 061 is thin and uneven. When a patterning process is used to form the pattern of the pixel electrode 03, due to the uneven thickness of the resin layer 06, the photoresist layer 09 may be thicker in the area between the two via holes 061 in the resin layer 06 than in other areas.

Thus, it takes longer time to expose and develop the thicker photoresist layer 09 in the problematic area between adjacent two via holes 061. When the photoresist layer 09 in other area is properly exposed and developed, the photoresist layer 09 in the problematic area may not have sufficient exposure and may have residues left after being developed. As shown in FIG. 3, after the photoresist layer 09 is exposed and developed, the pixel electrode material film 031 is etched to form the pixel electrode 03. When the under exposed photoresist layer 09 leaves residues behind, the subsequent etching process of the pixel electrode may leave residues on the resin layer 06 in the area between the two adjacent via holes 061. The electrode residues may increase the risk of short circuiting between the adjacent pixel structures and affect operation of adjacent pixel structures. To remove the electrode residues, the patterning process needs to extend the exposure time and to consequently reduce the production speed.

The present disclosure provides an array substrate, a fabrication method of the array substrate, and a display device including the array substrate. As disclosed, a light compensating structure may be configured between the adjacent thin film transistors of the array substrate to evenly distribute the amount of light exposure in the patterning process of forming the pixel electrode and other structures over the pixel electrode. Accuracy of the formed patterns of the pixel electrode and other structures over the pixel electrode is therefore assured. Proper functioning of the adjacent pixel structures of the array substrate is therefore provided. The productivity is improved.

As disclosed, when forming an array substrate, patterning processes are used to form pixel structures including thin film transistors, pixel electrodes over the thin film transistors and, an insulating layer and a common electrode layer over the pixel electrodes. In the patterning processes, each photoresist layer is subject to one exposure. Via holes are formed in the insulating layer to electrically connect the pixel electrode with drain electrode of the thin film transistor. The portion of the insulating layer in the area (also referred to as problematic area) between the two adjacent via holes is thinner than the portions in other areas. As a result, the photoresist layer in the problematic area is thicker than in other areas. During the light exposure stage of the patterning process, the photoresist layer in the problematic area receives equal amount of light exposure as in other areas. However, the amount of the light exposure is insufficient for the thicker photoresist layer in the problematic area.

As disclosed herein, a light compensating structure is configured to increase the amount of light exposure for the thicker portion of the photoresist layer in the problematic area. Due to the light compensating effect of the light compensating structure, the same amount of light exposure gives sufficient exposure to the thicker portion of photoresist layer in the problematic area. Because the extra amount of light exposure is no longer needed for the photoresist layer in the problematic area, the production speed is increased. In the meantime, the risk of short circuit between the adjacent pixel structures caused by the residues due to the insufficient exposure in the patterning process is reduced.

For example, the present disclosure provides an array substrate. The array substrate includes a first electrode, a second electrode and an insulating layer disposed between the first electrode and the second electrode. The first electrode includes a plurality of first sub-electrodes. The second electrode includes a plurality of second sub-electrodes. A plurality of via holes is configured in the insulating layer. The plurality of the second sub-electrodes are electrically connected to the corresponding plurality of the first sub-electrodes through the via holes in the insulating layer.

Figure 5:
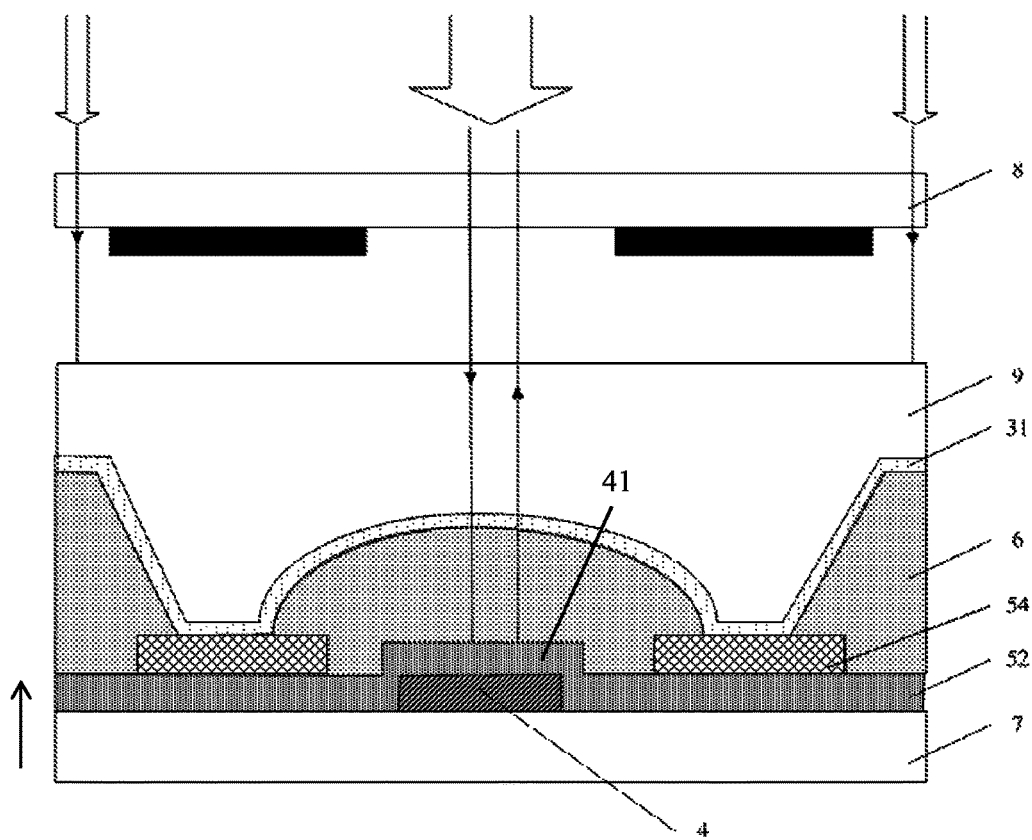
FIGS. 5-7 illustrates a cross sectional view of an exemplary array substrate shown in FIG. 4 in the A-A direction according to various exemplary embodiments of the present disclosure.

As disclosed, a light compensating structure may be disposed under the uneven portion of the insulating layer to locally improve an exposure efficiency in a photolithographic process for forming the second electrode. For example, the light compensating structure is configured under the insulating layer, which may be near the via holes and/or in the area surrounding the via holes. The light compensating structure may be made of an opaque and reflective material, or may include a protrusion structure 4 having a thickness to protrude the uneven portion 41 of the insulating layer 52 in a direction (the arrow shown in FIG. 5) close to the second electrode and away from a base substrate of the array substrate, as shown in FIG. 5. In other embodiments, the light compensating structure may be made of an opaque and reflective material and may be a protrusion structure having a suitable thickness to protrude the uneven portion of the insulating layer in a direction close to the second electrode to locally improve the exposure efficiency in the photolithographic process for forming the second electrode. That is, the light compensating structure may amplify the effect of the same amount of light exposure in the patterning process of forming the second electrode.

In various embodiments, one or more thin film transistors may be configured in each pixel cell. The light compensating structure may cover at least a surrounding area of the via hole in the insulating layer. For example, when two thin film transistors are inversely configured in each pixel cell, the light compensating structure may be configured under the uneven portion of the insulating layer between two adjacent via holes corresponding to two adjacent drain electrodes of the two thin film transistors. In another example, when one thin film transistor is configured in each pixel cell, and the light compensating structure is disposed under the via hole and the surrounding area of the via hole of each pixel cell. In this case, a projected area of the via hole may cover the entire light compensating structure or may overlap with the light compensating structure.

The present disclosure is applicable to the following exemplary scenario. The insulating layer is disposed between the thin film transistor and the pixel electrode. For example, the insulating layer has a greater thickness of about 1.5 µm to about 5 µm. A plurality of via holes is formed within a limited distance, e.g., about 10 µm, in the insulating layer. In one example, the area between adjacent via holes in the insulating layer is the problematic area including the uneven portion of the insulating layer, where the photoresist layer is thick and will not receive sufficient light exposure in the subsequent patterning process. Alternatively, when only a single via hole is formed in the insulating layer, the photoresist material inside the via hole does not have sufficient light exposure in the patterning process. The present disclosure applies to the array substrate and the related display panel and device having the array substrate.

In one embodiment, the insulating layer is made of resin material. The insulating layer has a thickness of about 1.5 µm to about 5 µm. In the following descriptions, the insulating layer made of a resin material is used as an example to illustrate the insulating layer between the thin film transistor and the pixel electrode and the insulating layer between the structure similar to the thin film transistor and the electrode. Of course, any suitable insulating layer may be used and encompassed in the present disclosure.

The First Exemplary Embodiment

One aspect of the first exemplary embodiment provides an array substrate. The array substrate includes a first electrode, a second electrode and an insulating layer disposed between the first electrode and the second electrode. The first electrode includes a plurality of first sub-electrodes. The second electrode includes a plurality of second sub-electrode. A plurality of resin-layer-via-holes is configured in the resin layer. The plurality of the second sub-electrodes is electrically connected to the plurality of the first sub-electrodes through the plurality of the corresponding resin-layer-via-holes.

As shown in FIGS. 4-7, the array substrate includes a display region and a non-display region surrounding the display region. The display region is configured with gate lines 1 and data lines 2. The gate lines 1 and the data lines 2 are crossly configured to define pixel cells. The pixel cell is configured with a thin film transistor. The first sub-electrode is the drain electrode 54 of the thin film transistor. The resin-layer-via-hole 61 is configured in the resin layer 6 and corresponding to the drain electrode 54. The second sub-electrode is the pixel electrode 3 positioned over the resin layer 6.

A light compensating structure 4 is configured under the resin layer 6 and between the two resin-layer-via-holes 61. The disclosed array substrate includes the pixel cell configured with the thin film transistor and the pixel electrode 3 configured above the thin film transistor. The resin layer 6 is disposed between the thin film transistor and the pixel electrode 3. The resin layer has an uneven portion/area, such as a thin area, having a thickness thinner than other area(s) having a predetermined thickness for the resin layer. The light compensating structure 4 is configured under the thin area of the resin layer 6.

As disclosed herein, a bottom gate type thin film transistor is used as an example to illustrate the pixel structure of the array substrate, although the disclosed method and device may be applied to any suitable array substrate in a display device.

Figure 6:
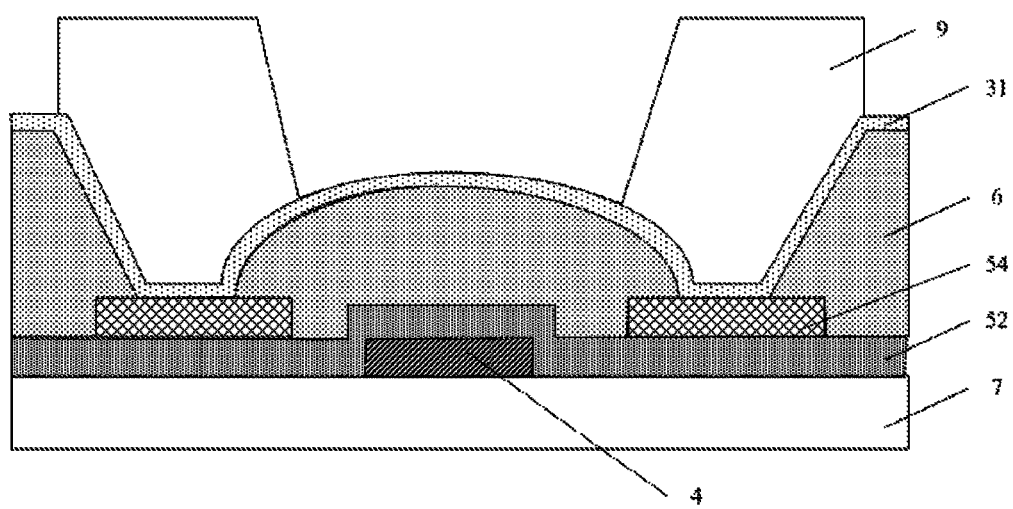

For example, the pixel structure may include layers stacked one over another. In one embodiment, as shown in FIGS. 4-6, from a bottom layer to a top layer, the pixel structure includes a gate electrode 51 (and the gate lines 1 connected to the gate electrode 51), an active layer 53, a source electrode and a drain electrode 54 (and the data lines 2 connected to the source electrode), the resin layer 6, and the pixel electrode 3.

Figure 4:
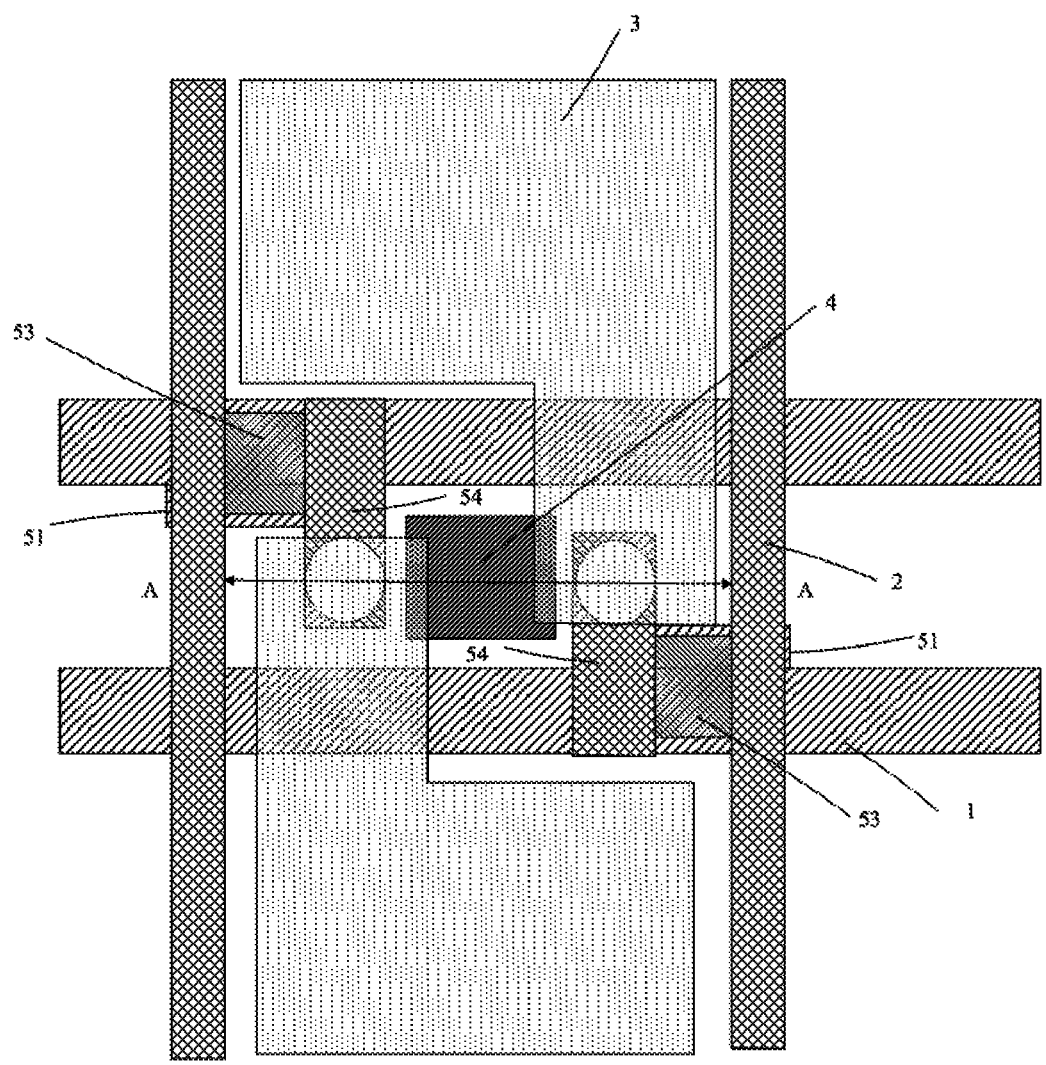
FIG. 4 illustrates a schematic view of a pixel structure of an exemplary array substrate according to the first exemplary embodiment of the present disclosure.

As shown in FIG. 4, two inversely configured or staggered thin film transistors are disposed between the two adjacent rows/columns of the pixel cells and are enclosed by the two adjacent data lines 2 defining the two adjacent sides of the two adjacent rows/columns of the pixel cells. Such configuration may reduce required number of data lines 2 and may save the space for the wirings of the driving electrodes. In addition, the resin layer 6 is disposed between the thin film transistor and the pixel electrode 3. The resin layer 6 is used to improve the display effect, reduce the power consumption of the display devices and reduce the risk of the imperfect cell process of the liquid crystal display device.

Especially for the in-cell touch display device, the resin layer 6 effectively reduces the disturbance to the pixel electrode 3 by the gate electrode 51, and the source electrode and the drain electrode 54. Thus, the noise and interference are reduced, the signal to noise ratio is increased, and the display and touch performance is improved.

The resin layer 6 disposed between the thin film transistor and the pixel electrode 3 has a thin area with a thickness thinner than other area(s) of the resin layer 6. The resin layer 6 may be designed to have a predetermined thickness. The predetermined thickness is referred to a film thickness when the film is coated on an even or a substantially even surface or is referred to a film thickness as originally designed for the array substrate. The light compensating structure 4 is configured under the thin area of the resin layer 6. In other words, the light compensating structure 4 is configured under the resin layer 6 between the two resin-layer-via-holes 61 corresponding to the two drain electrodes 54 of the two adjacent thin film transistors. The thin area of the resin layer may be the area surrounding the resin-layer-via-hole 61. The light compensating structure 4 amplifies the amount of light exposure in the patterning process to form the pixel electrode 3.

Figure 7:
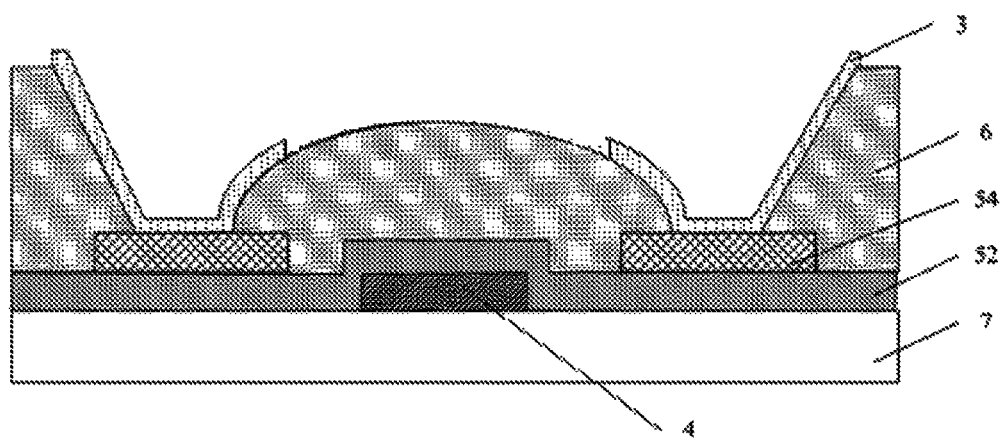

The thin film transistor is configured above the base substrate 7. The exemplary bottom gate type thin film transistor is used for illustration purpose. As shown in FIG. 7, over the base substrate 7, sequentially-configured are: the gate electrode 51 (connected to the gate lines 1, not shown in FIG. 7) and the light compensating structure 4, the gate insulating layer 52, the active layer 53, the source electrode (connected to the data lines 2 and configured at the intersection of the data lines 2 and the active layer 53, not show in FIG. 7) and the drain electrode 54, the resin layer 6 positioned over the source electrode and the drain electrode 54, and the pixel electrode 3 positioned over the resin layer 6. The resin-layer-via-hole 61 is formed in/through the resin layer 6 corresponding to the drain electrode 54 of the thin film transistor. The pixel electrode 3 is electrically and mechanically connected to the drain electrode 54 of the thin film transistor through the resin-layer-via-hole 61.

Under normal circumstance, the gate insulating layer 52 and the resin layer 6 are made of optically transparent material which does not block the top view of the pixel structure. The gate insulating layer 52 and the resin layer 6 are not shown in FIG. 4. The resin-layer-via-holes 61 are shown to better illustrate the position relationship for the thin film transistors enclosed between the adjacent data lines 2 of the adjacent pixel cells. At the same time, the layer configuration in FIG. 4 is optically transparent to certain extent to conveniently illustrate the layered structures of the array substrate and the position relationship between each layer.

In one embodiment, to assure the proper functioning of the thin film transistors, the light compensating structure 4 is electrically insulated from the neighboring thin film transistors (including the drain electrodes of the thin film transistors).

In one embodiment, the light compensating structure 4 is made of opaque and reflective metallic material. In an embodiment, the light compensating structure 4 is made of the same material as the gate electrode 51 of the thin film transistor. For example, the light compensating structure 4 may be made of at least one of molybdenum (Mo), niobium molybdenum alloy (MoNb), aluminum, aluminum niobium alloy (AlNb), titanium (Ti), and copper (Cu).

To further simplify the fabrication process, the light compensating structure 4 may be formed together with the gate electrode 51 of the thin film transistor, e.g., in a same single patterning process and/or using a same material. When the pattern of the gate electrode 51 is formed in a patterning process, the gate lines 1 are simultaneously formed. In addition, the light compensating structure 4 is simultaneously formed under the thin area of the resin layer 6 between the resin-layer-via-holes 61. Such thin area of the insulating layer needs light exposure in a patterning process.

As used herein, the patterning process may, for example, only include the etching process or both the photolithographic process and the etching process, or may include printing, ink jetting, and other suitable pattern-forming process to form predetermined patterns. The photolithographic process may include one or more steps selecting from: forming a photoresist layer on a material film, exposing the photoresist layer, developing the exposed photoresist film, etching the material film using the developed photoresist layer as an etch mask, and removing the photoresist layer. Based on the structures that need to be formed, appropriate steps of patterning process may be selected.

To obtain desirable light compensating effect, the light compensating structure 4 may be formed having a size/surface area matching an area of the resin layer 6, which is not covered by the formed pixel electrode 3. In other words, the pixel electrode 3 is a patterned layer including a plurality of sub-electrodes to expose surface portions of the underlying resin layer 6. The light compensating structure 4 may have a size/surface area corresponding to the exposed region of the resin layer 6 exposed between the pixel electrode 3. For example, the size/surface area of the light compensating structure 4 may be an exact match with a projected area on the base substrate 7 by a corresponding light exposure region of the pixel electrode 3 via openings in a photoresist layer during the photolithographic process. A simple shape of the light compensating structure 4 is shown in FIG. 4. The light compensating structure 4 is square shaped, although any suitable shape may be used for the light compensating structure 4 according to the light exposure region of the pixel electrode 3.

Specifically, when patterning to form the pixel electrode 3 on the resin layer 6 over a corresponding thin film transistor, a pixel electrode film 31 is formed conformally on the resin layer 6. The pixel electrode film 31 may have a substantially uniform thickness. Then, a photoresist layer 9 is formed over the pixel electrode film 31. Because the photoresist material is a fluid, the coated surface may be a flat surface.

Due to presence of the light compensating structure 4 under the resin layer 6, a top surface of the resin layer 6 may be raised to certain extent. Accordingly, the resin layer 6 becomes thicker in the thin area and less uneven across the base substrate 7. Then, the photoresist layer 9 thereon may have a thickness in the thin area between the resin-layer-via-holes 61 similar to the thickness in other area, and the thickness of the photoresist layer 9 in the thin area between the resin-layer-via-holes 61 may be reduced.

Additionally, the light compensating structure 4 reflects the light to compensate the amount of light exposure in the patterning process for forming the pixel electrode 3 above the resin layer 6. Extra amount of light exposure due to the reflected light assures the uniform thickness of the exposed photoresist layer 9 in all regions. No residues of the photoresist layer 9 may remain on the corresponding surface of the pixel electrode film 31. Thus, the metallic material of the pixel electrode film 31 will be completely removed over the thin area of the resin layer upon completion of the patterning process.

In one embodiment, the pixel electrode is made of at least one of indium gallium zinc oxide, indium zinc oxide, indium tin oxide, and indium gallium tin oxide.

Referring back to FIG. 5, in the exposure process, light passes through the etch mask 8 to reach the array substrate. Due to the reflection by the metallic material of the light compensating structure 4 configured between the resin-layer-via-holes 61 corresponding to the adjacent thin film transistors, the photoresist layer 9 between the resin-layer-via-holes 61 receives the amount of light exposure more than the initial transmittance. The photoresist layer 9 corresponding to the thin area of the resin layer 6 is more likely to be removed in the development process after exposure on the light exposure region of the photoresist layer 9 in FIG. 5. In this case, the photoresist layer 9 may be a positive photoresist layer.

FIG. 6 illustrates a schematic view of the exemplary array substrate after the development process of the photoresist layer 9 after exposure is completed. In practical application, the transmitted light and the reflected light may be calculated and adjusted based on the size of the light compensating structure 4 to achieve desirable light exposure.

As a result, except for the unexposed photoresist in a non-light exposure region, no residues remain. In the subsequent etching process, the pixel electrode film 31 that is not covered by the unexposed photoresist or that corresponds to the light exposure region can be easily removed.

FIG. 7 illustrates a schematic view of the exemplary array substrate after the etching process is completed. The light compensating structure 4 according to the present disclosure reflects and reuses the light for exposing the photoresist layer 9 to reduce the chance of metallic material residues of the pixel electrode film 31 in the patterning process of forming the pattern of the pixel electrode 3 and other structures. Thus, the production yield is improved. Compared to the conventional fabrication process, the present disclosure does not need to increase the amount of light exposure for the thin area of the resin layer 60 between the two resin-layer-via-holes 61. Thus, the production speed is increased.

Further, the disclosed array substrate also includes an insulating layer and a common electrode layer (not shown in FIG. 7) formed over the pixel electrode 3. The light compensating structure 4 also increases the amount of light exposure in the thin area of the resin layer 6 in the patterning process of forming the insulating layer and the common electrode layer. Because the light compensating structure 4 is configured between the adjacent thin film transistors of the array substrate, the amount of light exposure is evenly distributed in the patterning process of forming the patterns of the insulating layer and the common electrode layer. Thus, the desirable patterns of the insulating layer and the common electrode layer are assured. After the exposure process in completed, the exposed photoresist layer 9 is developed. Then, for the insulating layer (for example, made of silicon oxide or silicon nitride), a dry etching process may be used to remove the redundant insulating film to form the pattern of the insulating layer and conclude the patterning process of forming the insulating layer. For the common electrode layer, a wet etching process may be used to remove the redundant common electrode film to form the pattern of the common electrode layer and complete the patterning process of forming the common electrode layer.

The array substrate according to the present disclosure is suitable for the Advanced Super Dimension Switch (ADS) mode liquid crystal (LCD) display device. The pixel electrode 3 may be plate shaped. The common electrode layer may be slit shaped. The insulating layer may be disposed between the pixel electrode 3 and the common electrode layer.

The operational principle of the ADS mode LCD display device is described as follows. For example, a fringe electric field is produced by the slit shaped electrode. Another electric field is produced between the slit shaped electrode and the plate shaped electrode. Both electric fields are combined to form a multi-dimensional electric field. Between the slit shaped electrodes and directly above the electrodes, the multi-dimensional electric field makes the randomly aligned liquid crystal molecules rotate in the liquid crystal compartment. Thus, the liquid crystal alignment control is improved and the light transmittance is increased. The ADS technology improves the picture quality of the liquid crystal display device and provides the benefits of high resolution, high transmittance, low power consumption, wide viewing angle, high aperture ratio, low chromatic aberration, absence of mura defects, etc.

The present disclosure provides an array substrate suitable for making ADS mode liquid crystal display device and reducing the number of data lines required. A problematic area is defined as the relatively thinner portion of the resin layer due to the shortened distance between the two adjacent resin-layer-via-holes. The photoresist layer is relatively thicker in the problematic area compared to other area. The light compensating structure is configured under the problematic area to achieve the desirable improvement in the process of forming the pixel electrode and other structures above the pixel electrode.

Due to the configuration of the light compensating structure between the adjacent thin film transistors of the array substrate, the amount of light exposure is more evenly distributed in the patterning process of forming the pixel electrode and other structures above the pixel electrode. Further the chance of residues of the photoresist layer that is not removed in the area is reduced in the patterning process of forming the pixel electrode and other structures above the pixel electrode. The present disclosure not only assures the accuracy of the formed patterns of the pixel electrode and other structures above the pixel electrode, but also guarantees the proper functioning of the adjacent pixel structures of the array substrate. Thus, the productivity is improved.

The Second Exemplary Embodiment

The present embodiment provides an array substrate. The array substrate is suitable for the twisted nematic (TN) mode liquid crystal display device. Compared to the first embodiment, the array substrate includes only the resin layer and the pixel electrode above the thin film transistor, but does not include a common electrode in the array substrate.

The specific distribution of the pixel structures of the array substrate is illustrated in FIG. 4. The liquid crystal display device includes an array substrate, a counter-configured color filter substrate, and the liquid crystals contained between the two substrates. The pixel electrode 3 is plate shaped. The pixel electrode 3 of the array substrate and a common electrode in the color filter substrate are coordinated to form the electric field to make liquid crystal molecules rotate to display images.

The array substrate according to the present embodiment includes other structures similar to that of the first embodiment, which will not be described herein.

Due to the configuration of the light compensating structure between the adjacent thin film transistors of the array substrate, the amount of light exposure is more evenly distributed in the patterning process of forming the pixel electrode. Further residues of the photoresist layer are less likely to be removed in the problematic area in the patterning process of forming the pixel electrode. The present embodiment not only assures the accuracy of the formed patterns of the pixel electrode, but also guarantees the proper functioning of the adjacent pixel structures of the array substrate. Thus, the productivity is improved.

The Third Exemplary Embodiment

The present embodiment provides an array substrate. Compared to the first and second embodiments, the array substrate has different arrangement of the pixel structures.

In the present embodiment, a thin film transistor is configured in each pixel cell. The thin film transistor in each pixel cell is configured in a pixel cell defined by the two adjacent rows/columns of data lines. The scenario of shortened distance between the two thin film transistors of the first and second embodiments is not applicable. The light compensating structure is configured under the resin layer surrounding the resin-layer-via-hole corresponding to the drain electrode of the thin film transistor.

In the present embodiment, the problematic area is defined as the portion of the resin layer surrounding the resin-layer-via-hole corresponding to the drain electrode of the thin film transistor. The problematic area has a thickness thinner than the thickness configured for the resin layer. The light compensating structure is configured under the problematic area surrounding to the resin-layer-via-hole. The present embodiment is applicable to the pixel cells having only one resin-layer-via-hole. The photoresist layer is too thick in the resin-layer-via-hole to be removed by the normal amount of light exposure. The light compensating structure configured near the resin-layer-via-hole and the area surrounding the resin-layer-via-hole provides extra amount of light exposure.

Figure 9:
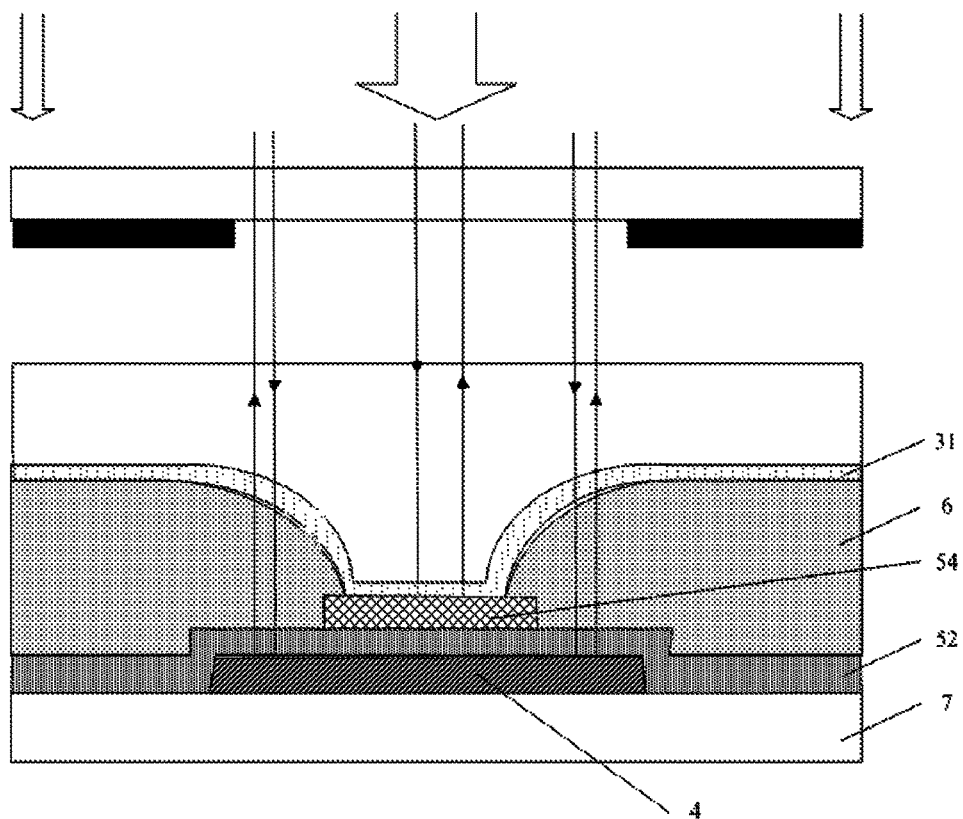
FIG. 9 illustrates a cross sectional view of an exemplary array substrate according to the third exemplary embodiments of the present disclosure.

As shown in FIG. 9, the light compensating structure 4 is configured under the resin-layer-via-hole 61 as well as the area surrounding the resin-layer-via-hole 61 corresponding to the thin film transistor. In this case, the photoresist layer used for forming the pixel electrodes may be a negative photoresist layer. Due to the thickness of the resin layer 6, the resin-layer-via-hole 61 gradually transitions from a narrow bottom to a wide top. The light compensating structure 4 is configured to match the wide top opening of the resin-layer-via-hole 61. The transition area that widens the resin-layer-via-hole 61 is defined as the area surrounding the resin-layer-via-hole 61.

Figure 8:
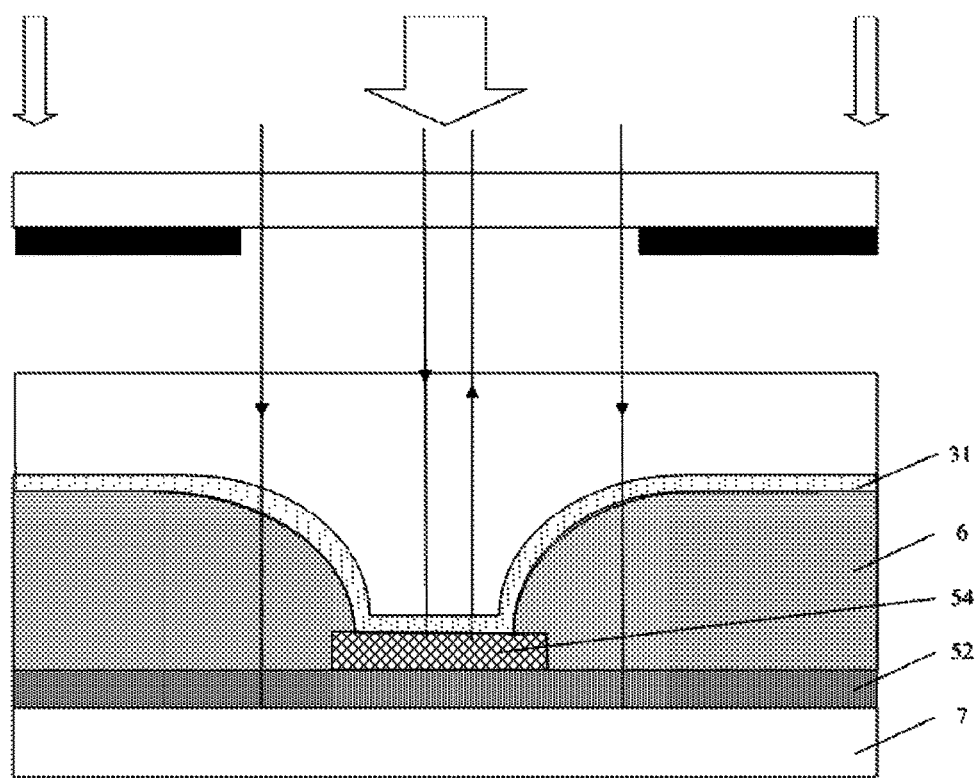
FIG. 8 illustrates a cross sectional view of an array substrate having a single via hole in a pixel cell.

FIG. 8 illustrates an array substrate that does not include a light compensating structure 4, compared with the structure shown in FIG. 9. In the patterning process of forming the pixel electrode 3, the array substrate having only one resin-layer-via-hole 61 may have residues of the photoresist layer 9 inside the resin-layer-via-hole 61. In the subsequent etching process, the array substrate may have residues of the pixel electrode film 31 inside the resin-layer-via-hole 61. Thus, the normal functioning of the pixel electrode is affected.

Compared with the array substrate that does not have the light compensating structure as shown in FIG. 8, the array substrate according to the present embodiment increases the amount of light exposure due to the light reflection by the metallic material of the compensating unit 4. The photoresist layer 9 inside the resin-layer-via-hole 61 is exposed to the amount of light exposure more than the initial transmitted amount. The amount of light exposure is more evenly distributed in the patterning process of forming the pixel electrode 3. The present embodiment not only assures the accuracy of the formed patterns of the pixel electrode, but also guarantees the proper functioning of the adjacent pixel structures of the array substrate. Thus, the productivity is improved.

The Fourth Exemplary Embodiment

The present embodiment provides an array substrate. Compared with the first, second and the third embodiments, the light compensating structure according to the present embodiment is configured in non-display region.

Specifically, the first electrode includes the lead-out electrode configured in the non-display region. The second electrode includes the connection electrode positioned above the lead-out electrode. The resin layer extends to the non-display region and is disposed between the lead-out electrode and the connection electrode. The resin-layer-via-hole is configured in the portion of the resin layer corresponding to the lead-out electrode. The light compensating structure is configured under the resin-layer-via-hole and the area surrounding the resin-layer-via-hole.

The array substrate according to the present embodiment is illustrated in FIG. 9. A patterning process is used to form the connection electrode that is connected to the lead-out electrode in the array substrate having only one resin-layer-via-hole 61. The light compensating structure 4 increases the amount of light exposure to the photoresist layer 9 inside the resin-layer-via-hole 61 that connects the lead-out electrode to the connection electrode. Thus, the electrode residues such as ITO residues are avoided in the subsequent process and normal functioning of the connection electrode is assured.

Compared with the first, second and third embodiments, the light compensating structure according to the present embodiment is configured in the non-display region at the periphery of the display region of the array substrate. The array substrate has only one resin-layer-via-hole in a pixel cell. The electrodes are electrically connected through the resin-layer-via-hole. At this point, the connection electrode is electrically connected to the lead-out electrode formed under the resin layer through the resin-layer-via-hole. In the patterning process of forming the connection electrode, the portion of the photoresist layer formed inside the resin-layer-via-hole is too thick to be removed by the normal amount of light exposure. The light compensating structure increases the amount of light exposure to the photoresist layer above the resin-layer-via-hole and the area surrounding the resin-layer-via-hole. The resulted exposure effect reduces the chance of residues of connection electrode film in the thin area of the resin layer and assures the accuracy of the pattern of the connection electrode. Thus, the productivity is improved.

The Fifth Exemplary Embodiment

The present embodiment provides a display device. The display device includes any one of the array substrate according to the first, second, third and fourth embodiments.

The display device may be liquid crystal display panel, electronic paper, mobile phone, tablet computer, television, monitor, laptop computer, digital photo frame, navigation device and other devices and products with display function.

Due to the use of the light compensating structure of the disclosed array substrate, the display device has high production yield, desirable display performance, and good display effect.

The array substrate according to the present embodiment takes advantages of the configuration of the light compensating structure under the thin area of the resin layer to increase the amount of light exposure to the thickened photoresist layer inside the resin-layer-via-hole and to reduce the chance of residues of the first electrode and other structures above the first electrode over the thin area of the resin layer. Thus, the production speed is increased, the production yield is improved and the display effect is improved.

Figure 10:
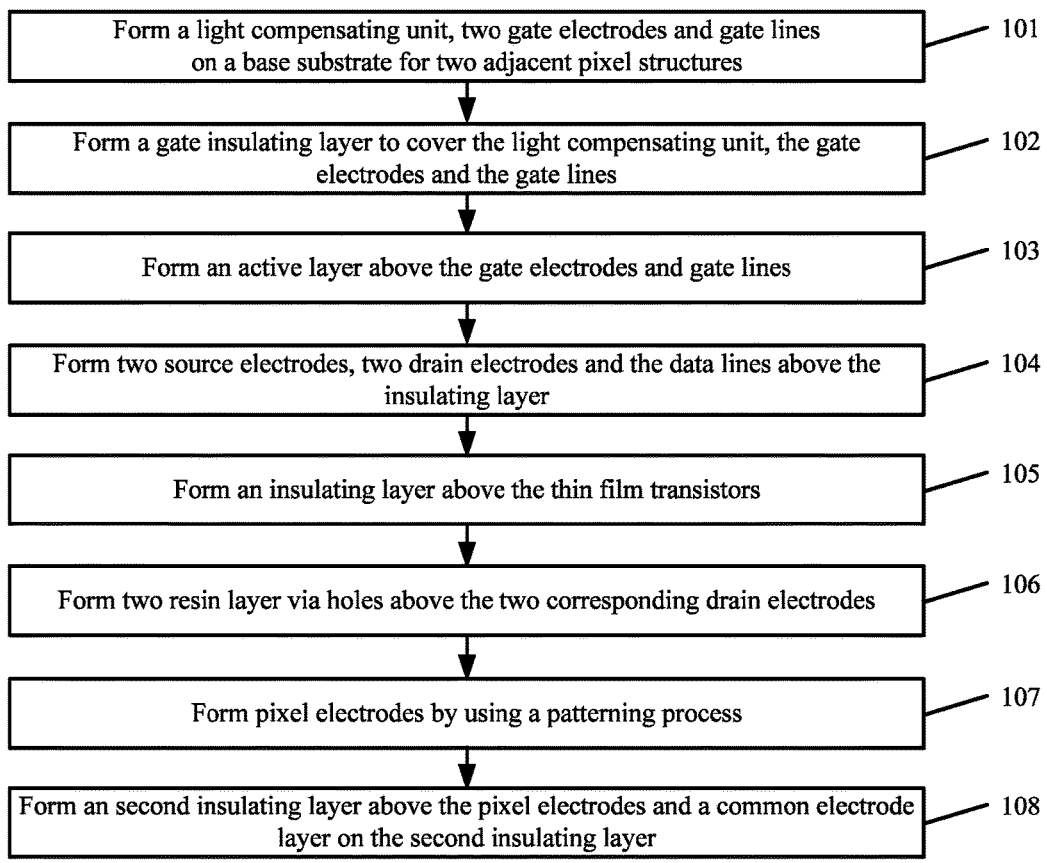
FIG. 10 illustrates a flow chart of an exemplary method for fabricating an exemplary array substrate according to various exemplary embodiments of the present disclosure.

The present disclosure also provides a method of fabricating the disclosed array substrate. FIG. 10 illustrates a flow chart of an exemplary method for fabricating an exemplary array substrate according to various exemplary embodiments of the present disclosure.

In Step 101 of FIG. 10, a patterning process is used to form a light compensating structure, two gate electrodes and gate lines on a base substrate for two adjacent pixel structures. The gate lines 1 are connected to the gate electrode 51.

In Step 102 of FIG. 10, a gate insulating layer is formed to cover the light compensating structure, the gate electrodes and the gate lines.

In Step 103 of FIG. 10, an active layer is formed above the gate electrodes and the gate lines.

In Step 104 of FIG. 10, a patterning process is used to form two source electrodes, two drain electrodes and the data lines above the insulating layer. The data lines 2 are connected to the source electrodes. At this point, two inversely configured thin film transistors are formed between the two adjacent pixel cells defined by the crossly configured gate lines 1 and data lines 2.

In Step 105 of FIG. 10, a resin layer is formed above the thin film transistors.

In Step 106 of FIG. 10, two resin-layer-via-holes are formed above the two corresponding drain electrodes. The portion of the resin layer 6 near the resin-layer-via-holes 61 and the area surrounding the resin-layer-via-holes 61 may be thinner due to the shortened distance between the two resin-layer-via-holes 61 and may be defined as the thin area.

In Step 107 of FIG. 10, a patterning process is used to form pixel electrodes. A photoresist layer 9 may be coated on the resin layer 6. The photoresist layer 9 may thicker above the thin area of the resin layer 6 and may need light exposure more than the amount for other area. Aided by the light compensating structure 4, the thicker photoresist layer 9 may be removed without leaving any residues above the thin area.

In Step 108 of FIG. 10, a second insulating layer is formed on the pixel electrodes and a common electrode layer is formed on the insulating layer. The pixel electrodes and the common electrode layer may jointly control the rotation of the liquid crystal molecules to display images.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An array substrate, comprising:
    a first electrode including a plurality of first sub-electrodes;
    a second electrode including a plurality of second sub-electrodes; and
    an insulating layer disposed between the first electrode and the second electrode, wherein:
        a plurality of via holes is formed in the insulating layer, and
        the plurality of the second sub-electrodes is electrically connected to the plurality of the first sub-electrodes correspondingly through the plurality of the via holes; and
    a light compensating structure disposed under an uneven portion of the insulating layer to locally improve an exposure efficiency in a photolithographic process for forming the second electrode, and the light compensating structure includes a protrusion structure having a thickness to protrude the uneven portion of the insulating layer in a direction close to the second electrode.

2. The array substrate of claim 1, wherein the light compensating structure is made of an opaque and reflective material.

3. The array substrate of claim 1, wherein:
the first electrode includes a pixel electrode,
the second electrode includes a drain electrode of a thin film transistor, and
the light compensating structure and a gate electrode of the thin film transistor are formed of a same material in a single patterning process.

4. The array substrate of claim 1, wherein the insulating layer is made of a resin material.

5. The array substrate of claim 1, wherein the insulating layer has a thickness of about 1.5 µm to about 5 µm.

6. The array substrate of claim 1, wherein the light compensating structure is made of one or a combination of tungsten, molybdenum niobium alloy, aluminum, aluminum neodymium alloy, titanium, and copper.

7. The array substrate of claim 1, wherein the light compensating structure has a shape and a size matching with a shape and a size of a light exposure region in the photolithographic process for forming the second electrode.

8. The array substrate of claim 1, wherein the light compensating structure is square-shaped.

9. The array substrate of claim 1, wherein the light compensating structure is electrically insulated from the first electrode and the second electrode.

10. The substrate of claim 1, further including:
a display region, and
a non-display region surrounding the display region, wherein:
gate lines and data lines are configured in the display region and are crossly configured to define pixel cells;
at least one thin film transistor is configured in each pixel cell;
the first sub-electrode is a drain electrode of the thin film transistor;
a via hole is configured in the insulating layer corresponding to each drain electrode;
the second sub-electrode is a pixel electrode configured over the insulating layer; and
the light compensating structure, disposed under the uneven portion of the insulating layer to locally improve the exposure efficiency, covers at least a surrounding area of the via hole in the insulating layer.

11. The array substrate of claim 10, wherein:
the at least one thin film transistor includes two thin film transistors inversely configured in each pixel cell; and
the light compensating structure is configured under the uneven portion of the insulating layer between two adjacent via holes corresponding to two adjacent drain electrodes of the two thin film transistors.

12. The array substrate of claim 10, wherein:
the at least one thin film transistor includes one thin film transistor configured in each pixel cell; and
the light compensating structure is disposed under the via hole and the surrounding area of the via hole of each pixel cell.

13. The array substrate of claim 10, wherein:
the first electrode further includes a lead-out electrode configured in the non-display region;
the second electrode further includes a connection electrode positioned over the lead-out electrode;
the insulating layer is extended to the non-display region and is disposed between the lead-out electrode and the connection electrode;
the via hole is configured in the insulating layer adjacent to the corresponding lead-out electrode; and
the light compensating structure is positioned under the via holes and the surrounding area of the via holes in the insulating layer.

14. A display device, comprising the array substrate according to claim 1.

15. A method for forming an array substrate, comprising:
forming a first electrode including a plurality of first sub-electrodes;
forming a second electrode including a plurality of second sub-electrodes; and
forming an insulating layer between the first electrode and the second electrode;
forming a plurality of via holes in the insulating layer, wherein the plurality of the second sub-electrodes is electrically connected to the plurality of the first sub-electrodes correspondingly through the plurality of the via holes; and
forming a light compensating structure under an uneven portion of the insulating layer to locally improve an exposure efficiency in a photolithographic process for forming the second electrode,
wherein the light compensating structure includes a protrusion structure having a thickness to protrude the uneven portion of the insulating layer in a direction close to the second electrode.

16. The method of claim 15, wherein the light compensating structure is made of an opaque and reflective material.

17. The method of claim 15, wherein the light compensating structure includes a protrusion structure having a thickness to protrude the uneven portion of the insulating layer in a direction close to the second electrode.

18. The method of claim 15, wherein:
the first electrode includes a pixel electrode,
the second electrode includes a drain electrode of a thin film transistor, and
the light compensating structure and a gate electrode of the thin film transistor are formed of a same material in a single patterning process.

19. The method of claim 15, wherein the insulating layer is made of a resin material.

* * * * *